US 010956892B2

(12) United States Patent
McCracken et al.

(10) Patent No.: US 10,956,892 B2
(45) Date of Patent: Mar. 23, 2021

(54) TRANSACTION PERFORMANCE

(71) Applicant: NCR Corporation, Duluth, GA (US)

(72) Inventors: Heather McCracken, Fife (GB); Joseph Gallagher, Kinross-shire (GB); Norman G. Taylor, Dundee (GB)

(73) Assignee: NCR Corporation, Atlanta, GA (US)

( * ) Notice: Subject to any disclaimer, the term of this patent is extended or adjusted under 35 U.S.C. 154(b) by 93 days.

(21) Appl. No.: 13/962,375

(22) Filed: Aug. 8, 2013

(65) Prior Publication Data
US 2015/0046322 A1    Feb. 12, 2015

(51) Int. Cl.
G06Q 20/32 (2012.01)
G06Q 20/10 (2012.01)
G07F 19/00 (2006.01)
G06Q 20/38 (2012.01)

(52) U.S. Cl.
CPC ..... G06Q 20/3223 (2013.01); G06Q 20/1085 (2013.01); G06Q 20/3221 (2013.01); G06Q 20/3227 (2013.01); G06Q 20/385 (2013.01); G07F 19/206 (2013.01); G07F 19/211 (2013.01)

(58) Field of Classification Search
CPC .................................................. G06Q 20/32
See application file for complete search history.

(56) References Cited

U.S. PATENT DOCUMENTS

| 5,010,238 | A | * | 4/1991 | Kadono | G07F 19/207 235/379 |
| 6,448,958 | B1 | | 9/2002 | Muta | |
| 7,464,133 | B1 | * | 12/2008 | Kasasaku | H04L 29/06 709/203 |
| 8,245,916 | B2 | | 8/2012 | Drummond et al. | |
| 8,510,222 | B2 | | 8/2013 | Bachrany et al. | |
| 8,706,627 | B2 | | 4/2014 | Shore | |
| 2002/0099634 | A1 | * | 7/2002 | Coutts | G06Q 20/1085 705/35 |
| 2003/0004112 | A1 | | 1/2003 | Potter et al. | |
| 2006/0149846 | A1 | * | 7/2006 | Schuba | 709/229 |
| 2007/0155418 | A1 | * | 7/2007 | Shau et al. | 455/550.1 |

(Continued)

FOREIGN PATENT DOCUMENTS

| CN | 102968860 A | | 3/2013 | |
| CN | 103036890 A | * | 4/2013 | H04L 29/06 |

(Continued)

OTHER PUBLICATIONS

"How They Work : "How ATM machines Work"." The New Times, Sep. 11, 2009, https://www.newtimes.co.rw/section/read/79659. (Year: 2009).*

(Continued)

Primary Examiner — Kito R Robinson
Assistant Examiner — Shacole C Tibljas
(74) Attorney, Agent, or Firm — Schwegman, Lundberg & Woessner

(57) ABSTRACT

A method and apparatus are disclosed for performing a transaction at a hand held device. The method comprises the steps of accessing a virtualized operating system and Automated Teller Machine (ATM) application at a hand held device and performing a customer transaction at the hand held device using the virtualized operating system and ATM application.

15 Claims, 1 Drawing Sheet

(56) References Cited

U.S. PATENT DOCUMENTS

| | | | |
|---|---|---|---|
| 2008/0109375 A1* | 5/2008 | Ricci et al. | 705/76 |
| 2008/0288498 A1* | 11/2008 | Hinshaw | G06F 17/30575 |
| 2011/0238573 A1* | 9/2011 | Varadarajan | G06Q 20/1085 |
| | | | 705/35 |
| 2012/0011501 A1* | 1/2012 | Filali-Adib | G06F 9/45558 |
| | | | 718/1 |
| 2013/0097077 A1* | 4/2013 | Bachrany et al. | 705/43 |
| 2014/0136407 A1* | 5/2014 | Hazam | G06Q 20/10 |
| | | | 705/42 |

FOREIGN PATENT DOCUMENTS

| | | | | |
|---|---|---|---|---|
| CN | 103036890 A | * | 4/2015 | H04L 29/06 |
| EP | 0953947 | | 11/1999 | |
| JP | 2003-524841 A | | 8/2001 | |
| WO | 2001/067245 | | 9/2001 | |

OTHER PUBLICATIONS

EP Search Report dated Feb. 12, 2015, in EP Application No. 14175332.7 (EP2835777).

* cited by examiner

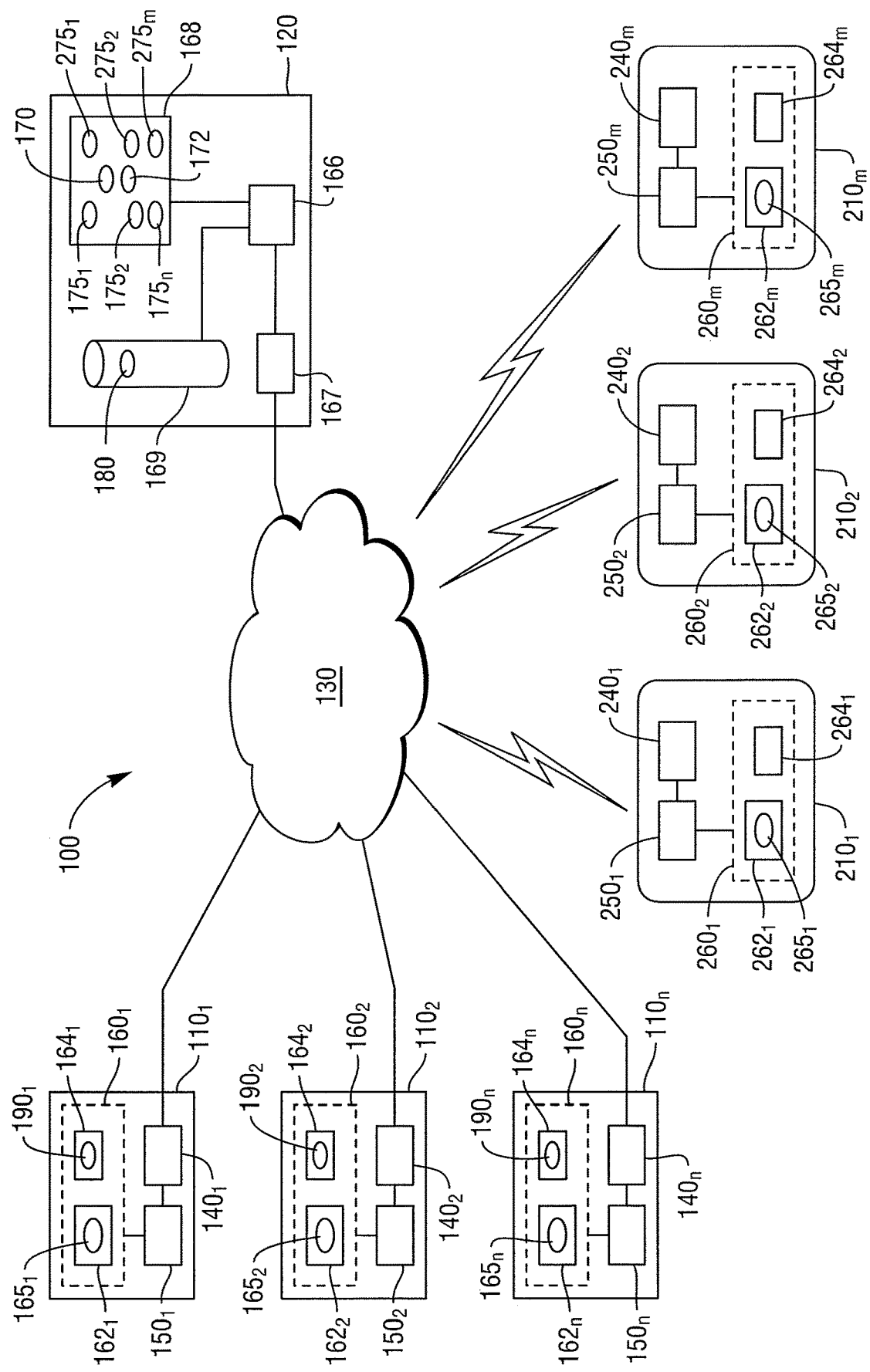

TRANSACTION PERFORMANCE

FIELD OF THE INVENTION

The present invention relates to a method and apparatus for performing transactions at a hand held device. In particular, but not exclusively, the present invention relates to performing a transaction at a hand held device such as a smartphone by accessing and using a virtualized operating system and Automated Teller Machine (ATM) application at the hand held device.

BACKGROUND OF THE INVENTION

Many types of Self-Service Terminal (SST) are known which enable a wide variety of customer transactions to be performed at the SST by a customer. For example, an Automated Teller Machine (ATM) is an example of an SST and it is known that users of ATMs can use such machines to deposit and/or withdraw currency notes. The control and operation of an ATM is complex and thus ATMs can be costly to manufacture and operate. Conventionally, a central processor and local data store (typically a disk drive) are provided in an ATM and the data store stores an Operating System (OS) and ATM application used by the ATM. This makes updating the operations which can be carried out at an ATM a time consuming and costly process because ATMs must be updated individually each time a change to the OS or ATM application is to be implemented.

It is known that certain mobile banking applications can be utilized via hand held devices (such as a feature phone, smartphone, tablet, PDA or the like) to perform certain transactions vis-à-vis a financial institution associated with a user of the hand held device. For example, a mobile bank application can be used to enable a hand held device user to view details of their account/s and order statements or authorize a transfer. ATM applications and mobile banking applications can thus be used to perform some similar types of transactions. For example, a customer can use an ATM or hand held device to make a balance enquiry or instruct a bank transfer to be made or to request a statement. However, an ATM application and a mobile banking application are conventionally completely independent. That is to say, they do not use the same mechanisms to communicate with a financial institution such as a bank. As such, when a bank updates an ATM application to offer a new type of transaction a corresponding update to a mobile banking application must also be made separately to enable the new transaction to be offered. This duplication results in increased effort, time and maintenance being required and is also prone to error.

SUMMARY OF THE INVENTION

It is an aim of the present invention to at least partly mitigate the above-mentioned problems.

It is an aim of certain embodiments of the present invention to provide a hand held device and a method of performing a transaction at a hand held device which uses access to a virtualized operating system and Automated Teller Machine (ATM) application at the hand held device to enable a customer transaction to be performed by a customer using the hand held device. As used herein, a virtualized operating system and ATM application refers to software that can be executed, for example, on a server, and can be accessed by an ATM and/or a hand held device. This enables transactions that do not involve any physical transfer of media to be performed at a hand held device.

It is an aim of certain embodiments of the present invention to provide a hand held device which can receive user inputs from a customer and/or monitor events that occur at a hand held device and which can forward these to a remote server and receive display data and device specific data from the server to enable a transaction to be performed at the hand held device.

It is an aim of certain embodiments of the present invention to utilize virtualization and cloud based services to use a hand held device such as a smartphone or tablet to run ATM transactions.

It is an aim of certain embodiments of the present invention to allow a hand held device such as a smartphone or tablet to access a virtualized ATM application via a network.

According to a first aspect of the present invention there is provided a method of performing a transaction at a hand held device, comprising the steps of:

accessing a virtualized operating system and Automated Teller Machine (ATM) application at a hand held device; and performing a customer transaction at the hand held device using the virtualized operating system and ATM application.

Aptly, the method further comprises:

receiving user inputs from a customer at a User Interface (UI) of the hand held device;

via a communication link, providing at least one of received user inputs or events from the hand held device to a remote server executing the operating system and ATM application; and receiving at least display data at the hand held device from the remote server responsive to said inputs and events.

Aptly, the method further comprises:

receiving user inputs from a customer at a hand held device;

monitoring events occurring at the hand held device; and providing, via a communication link, at least one of the received user inputs or the monitored events to a remote server executing the operating system and ATM application; whereby the step of receiving access to the virtualized operating system and ATM application further comprises the steps of:

receiving at the hand held device, display data, device specific data and routing information for the device specific data from the remote server responsive to said inputs or events;

presenting the display data to the customer;

conveying the device specific data to a device at the hand held device based on the routing information; and implementing, at the hand held device, one or more functions in response to the device specific data.

The step of receiving the display data, device specific data, and routing information may be implemented using a client associated with a virtual desktop infrastructure.

As used herein, the operating system and ATM application may include (i) a conventional (off-the-shelf) operating system, (ii) an ATM platform that extends and enhances the operating system to manage devices that are specific to an ATM (in other words, devices that are not usually provided on a personal computer, such as a cash dispenser, an encrypting PIN pad, and the like) and (iii) an ATM application that allows customers to perform transactions at an ATM and service engineers to exercise devices at the ATM.

Aptly, the method further comprises receiving the display data and command data at the hand held device via a communication link display protocol.

Aptly, the method further comprises initiating a transaction at the hand held device by touching a touchscreen display of a User Interface (UI) of the hand held device or selecting a card in an electronic wallet on the hand held device.

Aptly, the method further comprises initiating a transaction at the hand held device by inputting a customer authentication input at a User Interface (UI) of the hand held device.

Aptly, the method further comprises inputting a customer authentication by entering a one-time PIN.

Aptly, the step of inputting a customer authentication comprises selecting a correct picture sequence displayed on a user display of the hand held device.

Aptly, the step of performing a customer transaction comprises:
  withdrawing funds from a bank account associated with a user of the hand held device; and
  crediting corresponding funds into an electronic wallet on the hand held device.

Aptly, the step of performing a customer transaction comprises:
  withdrawing funds from a bank account associated with a user of the hand held device; and
  crediting corresponding funds into a PayPal (trademark) or PingIt (trademark) account (or other social media account) associated with a user of the hand held device.

Aptly, the step of performing a customer transaction comprises downloading a bank statement to the hand held device.

Aptly, the step of performing a customer transaction comprises making a balance enquiry or money transfer request or bill payment.

According to a second aspect of the present invention there is provided a server that provides a hand held device with access to a virtualized operating system and Automated Teller Machine (ATM) application.

Aptly, the server further comprises at least one software image of an operating system and ATM application.

Aptly, the server further comprises:
  a Server Hardware Platform (SHP);
  a hypervisor running on the SHP; and
  at least one ATM desktop operating system instance on the SHP.

According to a third aspect of the present invention there is provided a method of operating a hand held device to perform a customer transaction for a user of the hand held device, the method comprising the steps of:
  during a communication session with a remote server providing access to a virtualized operating system and Automated Teller Machine (ATM) application to a hand held device, receiving a customer transaction request;
  providing the transaction request to the virtualized operating system and ATM application via the communication session; and
  receiving a response from the virtualized operating system and ATM application, said response including information to be presented by the hand held device to a user that the customer transaction has been performed.

Aptly, the method further comprises requesting a communication session with the remote server; and providing device information to the virtualized operating system and ATM application, said device information corresponding to text input and information display capabilities of the hand held device.

Aptly, the step of providing device information does not provide information corresponding to the capabilities of one or more media output devices.

As used herein, a virtualized operating system and ATM application means an operating system and ATM application that are not, as a whole, locally stored or locally executed at a hand held device. In certain embodiments of the present invention the whole operating system and ATM application is executed remotely with a local program, local at a hand held device, controlling display of information at the hand held device and routing of device-specific data to devices at the hand held device.

Aptly, the virtualized operating system and ATM application are provided by implementing a virtual desktop infrastructure.

Aptly, the hand held device may execute a virtual desktop client.

Certain embodiments of the present invention provide a hand held device with access to a virtualized operating system and ATM application which enables customer transactions to be performed at the hand held device using the access to the virtualized operating system and ATM application. As a result, modifications and/or amendments to transactions offered via an ATM or hand held device can be updated in a single step at a single point in a network and thereafter be utilized by multiple hand held devices networked so as to receive access to a virtualized operating system and ATM application.

One advantage of accessing a virtualized operating system and ATM application at a hand held device is that the hand held device has access to the robustness, inherent resilience, security, and ATM infrastructure (for transaction routing, authorization, and the like) that is provided by the operating system and ATM application. It would otherwise be very expensive to create a dedicated hand held device application that includes the robustness, inherent resilience, security and infrastructure that are provided by a typical ATM application.

BRIEF DESCRIPTION OF DRAWINGS

Embodiments of the present invention will now be described hereinafter, by way of example only, with reference to the accompanying drawings in which:

FIG. 1 is a schematic diagram illustrating a plurality of ATMs and smartphones connected to a remote server via a network so that these ATMs and hand held devices can receive access to a virtualized operating system and ATM application using a remote desktop infrastructure, according to a first embodiment of the present invention.

DESCRIPTION OF EMBODIMENTS

In the drawings like reference numerals refer to like parts.

FIG. 1 illustrates a system 100 which includes multiple Automated Teller Machines (ATMs) $110_{1 \ldots n}$ and illustrates how these are connected to a remote server 120 via a secure Internet Protocol (IP) network 130 according to a first embodiment of the present invention. It should also be appreciated that the remote server 120 is connected to a conventional transaction switch and/or authorization host (either via the IP network 130 or via a dedicated connection) to authorize transactions performed at one of the ATMs $110_{1 \ldots n}$ in the system 100.

Each ATM 110 includes different modules for enabling transactions to be performed and recorded by the ATM 110. These ATM modules (not shown in FIG. 1) include customer transaction modules and service personnel modules. The ATM modules include an ATM customer display, a card reader/writer module, an encrypting keypad module, a receipt printer module, a cash dispenser module, a journal printer module and the like. Each ATM 110 includes a network connection module (in the form of an Ethernet card) 140 which is connected to the remote server 120 via the IP network 130. Each ATM 110 includes a processor $150_{1 \ldots n}$ which can read from local memory $160_{1 \ldots n}$ (shown by the broken line in FIG. 1 to indicate that it comprises a logical address space). The local memory $160_{1 \ldots n}$ comprises, inter alia, DRAM 162, and non-volatile RAM 164 (which is used to store a recovery program).

Each ATM $110_{1 \ldots n}$ receives access to a virtualized operating system and ATM application at that ATM $110_{1 \ldots n}$. Customer transactions, and service engineer maintenance operations, are performed at the ATM $110_{1 \ldots n}$ using the access to the virtualized operating system and ATM application. The three ATMs $110_{1 \ldots n}$ shown in FIG. 1 receive access to the virtualized operating system and ATM application via a Virtual Desktop Infrastructure (VDI) mechanism. This separates the operating system environment and associated application software from the physical client device (the ATM $110_{1 \ldots n}$) that is used to access it.

For each ATM 110, execution of an ATM application takes place on a remote operating system which is linked to the ATM $110_{1 \ldots n}$ over a network using a remote display protocol through which the user (a customer or a service engineer at that ATM) interacts with the operating system and ATM application. Each ATM $110_{1 \ldots n}$ includes a thin client $165_{1 \ldots n}$ which communicates with a remote server 120.

The remote server 120, which is remote from each ATM $110_{1 \ldots n}$, comprises one or more processors 166 and a network connection 167 (in the form of an Ethernet card) to provide access to the IP network 130. The remote server 120 also includes a memory 168 and disk storage space 169.

The server 120 includes a Server Hardware Platform (SHP) running a conventional hypervisor 170 (which supports and implements a virtual desktop infrastructure service) in the memory 168. The hypervisor 170 used in this embodiment is a vSphere (trade mark) hypervisor, available from VMware, Inc., 3401 Hillview Ave, Palo Alto, Calif. 94304, U.S.A. The server 120 also executes a VDI manager 172 (in this embodiment, VMWare Horizon View (trade mark) available from VMWare.

The disk storage space 169 provides non-volatile storage for various files used by the server 120, including a generic template file 180. The generic template file 180 relates to an operating system and ATM application for the ATMs $110_{1 \ldots n}$. If a different ATM application is required on a first set of ATMs to a second set of ATMs (each set comprising one or more ATMs), then two different template files 180 may be used; but in this exemplary embodiment, only a single generic template file 180 is required. Also in this exemplary embodiment, having a different network connection module 140 in some of the ATMs $110_{1 \ldots n}$ does not require a different generic template file 180.

The hypervisor 170 allows multiple operating systems to execute on the same hardware. The VDI manager 172 is used to set up the VDI environment, create the generic template file 180 and provide security controls, certificates, and the like.

The server 120 also includes multiple instances $175_{1 \ldots n}$ of the generic template file 180. There is at least one instance $175_{1 \ldots n}$ of the generic template file 180 for each ATM $110_{1 \ldots n}$ that is active in the system 100. Each of these instances $175_{1 \ldots n}$ executes in the memory 168.

Each ATM 110 is linked to the server via the IP network 130 using a conventional remote display protocol which enables a customer or service engineer at an ATM to interact with the remote operating system and ATM application (executing as an instance $175_{1 \ldots n}$ of the generic template file 180). The remote display protocol used by each ATM $110_{1 \ldots n}$ in the system illustrated in FIG. 1 is PCoIP (PC over IP).

When one of the ATMs (for example, ATM $110_1$) boots up, the thin client $165_1$ in that ATM $110_1$ connects to the server 120 and a communication session is established. The ATM $110_1$ provides the server 120 with information about modules that are present on the ATM $110_1$. This information is basic information conveyed via a bus protocol (for example, USB). The thin client $165_1$ records a unique port number for each module that is connected to the ATM $110_1$.

When the server 120 receives the initial communication from the ATM $110_1$, the server 120 creates, or allocates an already created, instance $175_{1 \ldots n}$ of the generic template file 180 to that ATM $110_1$. The instance $175_{1 \ldots n}$ created for (or allocated to) that ATM $110_1$ then conveys information to that ATM $110_1$, including display information and device-specific (or module-specific) data.

The ATM $110_1$ receives that conveyed information and routes the received information based on the port number assignments. For example, display information is conveyed to a processor in the ATM $110_1$ for rendering on a customer display (or a service engineer display) depending on the routing information associated with that data. If the ATM $110_1$ receives information that is intended for a device (or module) identified as, for example, port number four, then the thin client $165_1$ routes this information to that device (or module). For example, the information may be a command to initialize a card reader module at the ATM, and the card reader module may be connected to port number four. Although the ATM $110_1$ does not know that the device on port number four is a card reader, the instance $175_1$ knows this, and so the instance $175_1$ provides the correct command together with routing information that identifies the port number to the thin client $165_1$. This enables the thin client $165_1$ to route the command correctly, even though the thin client $165_1$ does not understand the command or know the type of device the command relates to.

User inputs provided by a customer at an ATM 110 are detected by an appropriate device or module in the ATM 110. For example, a keyboard press to indicate a transaction being selected by a user is detected by the encrypting keypad module and conveyed to the thin client $165_1$ The thin client $165_1$ receives data from the device or module (the terms device and module are used interchangeably herein) as data conveyed from the port associated with that device. The thin client $165_1$ then conveys this data to the server 120 together with the port number information.

The server 120 relays this information to the instance $175_1$, which can interpret the meaning of this user input (that is, the type of transaction selected). In this manner, all user inputs at the ATM 110 are conveyed to the instance $175_1$ for that ATM 110.

Similarly, if a device or module in the ATM 110 detects an event (for example, a currency low event in a cash dispenser), then that device or module conveys that event to the thin client $165_1$. Again, the thin client $165_1$ forwards this to the server 120 together with the port number information for that device. The server 120 relays this information to the instance $175_1$ for that ATM 110, which can interpret the meaning of this event.

The instance $175_1$ for that ATM 110 sends display information and device-specific data in response to these user inputs and/or events. The thin client $165_1$ for that ATM 110 routes this received information based on the port number information provided therewith. For example, the display information is routed to the customer display. Card reader information (which may include low level commands that only firmware on that device can understand—that is, device-specific data) is routed to the port number that is associated with the card reader. The thin client $165_1$ is not (and does not need to be) aware of the type of device associated with each port number because the thin client $165_1$ is merely routing the information according to the port number provided with that information.

It should now be appreciated that display data, device specific data, and routing information for the device specific data at the ATM 110 is received at the ATM $110_1$ from the remote server 120 (specifically, from the instance $175_1$ for that ATM $110_1$) responsive to the inputs and events at the ATM 110. Display data can be presented to a customer via a customer display of a user interface at the ATM 110 and device specific data can be conveyed to a respective device at the ATM 110 (such as a card reader, a receipt printer, or a dispenser) based upon routing information that is common to both the ATM 110 and the instance $175_1$ for that ATM 110. Thereafter, one or more functions are implemented by the various devices at the ATM 110 in response to the device specific data received from the instance $175_1$ for that ATM 110.

On start-up of the ATM 110, a recovery program $190_{1 \ldots n}$ is executed in the non-volatile RAM 164 of the ATM 110. That is to say, for each ATM a respective non-volatile RAM 164 executes a recovery program 190. This ensures that from the time of an initial start-up operation there is always a recovery program 190 executing locally at the ATM 110.

The recovery program $190_{1 \ldots n}$ in each ATM 110 uses the connection module $140_{1 \ldots n}$ to monitor a network connection between that ATM 110 and the server 120. Because an ATM 110 receives access to a virtualized operating system and ATM application it is important that a communication link between the ATM 110 and the server 120 providing access to the virtualized operating system and ATM application remains in a communicative state. The recovery program 190 which constantly executes on an ATM 110 monitors the state of the communication link.

The recovery program 190 prevents any media that is part of an unfulfilled transaction from being accessible to a subsequent customer. This is implemented by the recovery program 190 communicating directly with devices in the ATM 110 (such as a customer display, a cash dispenser module, a card reader module, and the like) to ascertain the status of such devices (for example, media present in device, media being presented to a customer, media retracted to purge bin, and the like).

The recovery program 190 is operable to issue instructions to those devices to ensure that media provided as part of the interrupted transaction is not accessible to a subsequent customer. These instructions may be to request the device to retain or purge any media that has been prepared for presentation to the customer, but not yet presented. These instructions may also be to request the device to retract any media presented to a customer but not removed within a defined time limit (such as thirty seconds).

If the communication link fails, the recovery program 190 takes over control of the ATM 110. That is to say, the recovery program 190 includes code to provide instructions for dealing with a communication link failure so that such a failure can be indicated to a customer at the ATM 110 via the customer display and/or any customer card previously inserted into the ATM 110 can be returned via a card reader module.

The recovery program 190 also includes instructions for continually monitoring the communication link after a failure and identifying when a communication link is re-established between the ATM 110 and the remote server 120. When this occurs, the recovery program 190 initiates a reconciliation process identifying details of any transaction which may have been partly performed about the time of a communication link failure. Thereafter, the ATM 110 is again provided with access to a virtualized operating system and ATM application from the remote server 120 so that normal operation of the ATM 110 can resume.

FIG. 1 also helps illustrate how the system 100 includes multiple smartphones $210_{1 \ldots m}$ and illustrates how these are connected to the remote server 120 via the secure Internet Protocol (IP) network 130 according to the first embodiment of the present invention. It should also be appreciated that the remote server 120 is connected to a conventional transaction switch and/or authorization host (either via the IP network 130 or via a dedicated connection) to authorize transactions performed at one of the hand held devices $210_{1 \ldots m}$ in the system 100.

Each smartphone 210 is an example of a hand held device. Other hand held devices are feature phones, tablets, PDAs or the like. Each smartphone 210 includes different modules for enabling transactions to be performed and recorded by the smartphone 210. For example, these hand held device modules (not shown in FIG. 1) include a smartphone display, a keypad, an audio module and the like. Each smartphone 210 includes a network connection module 240 which is connectable to the remote server 120 via the IP network 130. For example, each smartphone connects to the network via a wireless communication link such as via WiFi through a wireless router or via a 3G or 4G link through a cellular network. Each smartphone 210 includes a processor $250_{1 \ldots m}$ which can read from local memory $260_{1 \ldots m}$ (shown by the broken line in FIG. 1 to indicate that it comprises a logical address space). The local memory $260_{1 \ldots m}$ comprises, inter alia, DRAM 262 and non-volatile RAM 264.

Each smartphone $210_{1 \ldots m}$ receives access to a virtualized operating system and ATM application at the smartphone $210_{1 \ldots m}$. As used herein, a virtualized operating system and ATM application refers to software that can be executed, for example, on a server, and can be accessed by an ATM and/or a hand held device. This enables transactions that do not involve any physical transfer of media to be performed at a hand held device. Customer transactions are performed at the smartphone $210_{1 \ldots m}$ using the access to the virtualized operating system and ATM application. The three smartphones $210_{1 \ldots m}$ shown in FIG. 1 receive access to the virtualized operating system and ATM application via a Virtual Desktop Infrastructure (VDI) mechanism. This separates the operating system environment and associated application software from the physical client device (the smartphone $210_{1 \ldots m}$) that is used to access it. It will be appreciated that access to the virtualized operating system and ATM application is initiated subsequent to a user making a selection at the user interface of the smartphone indicating that they wish to perform a financial transaction (i.e. by selecting an icon to launch an associated application).

For each smartphone 210, execution of an ATM application takes place on a remote operating system which is linked to the smartphone $210_{1 \ldots m}$ over a network using a remote display protocol through which the user (a customer of a financial institution) interacts with the operating system and ATM application. Each smartphone $210_{1 \ldots m}$ includes a thin client $265_{1 \ldots m}$ which communicates with the remote server 120.

As noted above, the disc storage space 169 of the server 120 includes a generic template file 180. The generic template file 180 relates to an operating system and ATM application not only usable by the ATMs $110_{1 \ldots n}$ but also for the smartphones $210_{1 \ldots m}$. If a different ATM application is required on a first set of smartphones to a second set of smartphones (each set comprising one or more smartphones), then different template files 180 may be used; but in this exemplary embodiment, only a single generic template file 180 usable by all ATMs and all smartphones is required.

The server 120 also includes multiple instances $275_{1 \ldots m}$ of the generic template file 180. There is at least one instance $275_{1 \ldots m}$ of the generic template file 180 for each smartphone $210_{1 \ldots m}$ that is active in the system 100. Each of these instances $275_{1 \ldots m}$ executes in the memory 168. Although given a different reference number to the instances $175_{1 \ldots n}$ associated with the ATMs $110_{1 \ldots n}$, the instances $275_{1 \ldots m}$ used by the smartphones $210_{1 \ldots m}$ are identical although a condition of each instance will reflect a status of a transaction.

Each smartphone 210 is linked to the server via the IP network 130 using a conventional remote display protocol which enables a customer at the smartphone to interact with the remote operating system and ATM application (executing as an instance $275_{1 \ldots m}$ of the generic template 180). The remote display protocol used by each smartphone $210_{1 \ldots m}$ in the system illustrated in FIG. 1 is PCoIP (PC over IP).

When an appropriate application is launched on a smartphone 210 (for example, smartphone $210_{1}$), which occurs when a user decides to perform a financial transaction, the thin client $265_{1}$ stored in the DRAM 262 connects to the server 120 and a communication session is established. The smartphone $210_{1}$ provides the server 120 with information about the modules that are present on the smartphone $210_{1}$. The thin client $265_{1}$ records a unique port number for each module that is connected to the smartphone $210_{1}$. When the server 120 receives the initial communication from the smartphone $210_{1}$ when an application on the smartphone is launched, the server 120 creates, or allocates an already created, instance $275_{1 \ldots m}$ of the generic template file 180 to that smartphone $210_{1}$. The instance $275_{1 \ldots m}$ created for (or allocated to) that smartphone $210_{1}$ then conveys information to that smartphone $210_{1}$, including display information and device-specific (or module-specific) data.

The smartphone $210_{1}$ receives that conveyed information and routes the received information based on the port number assignment. For example, display information is conveyed to a processor in the smartphone $210_{1}$ for rendering on a customer display depending on the routing information associated with that data. If the smartphone $210_{1}$ receives information that is intended for a device (or module) identified as, for example, port number five, then the thin client $265_{1}$ routes this information to that device (or module). For example, the information may be a command to make a desired sound via a speaker of the smartphone and the speaker may be connected to port number five. Although the smartphone $210_{1}$ does not know that the device on port number five is a speaker, the instance $275_{1}$ knows this, and so the instance $275_{1}$ provides the correct command together with routing information that identifies the port number to the thin client $265_{1}$. This enables the thin client $265_{1}$ to route the command correctly, even though the thin client $265_{1}$ does not understand the command or know the type of device the command relates to.

User inputs provided by a customer at the smartphone 210 are detected by an appropriate device or module in the smartphone 210. For example, a keyboard press to indicate a transaction being selected by a user is detected by the keypad module and conveyed to the thin client $265_{1}$. The thin client $265_{1}$ receives data from the device or module (the terms device and module are used interchangeably herein) as data conveyed from the port associated with that particular device. The thin client $265_{1}$ then conveys this data to the server 120 together with the port number information.

The server 120 relays this information to the instance $275_{1}$ which can interpret the meaning of this user input (that is to say the type of transaction selected). In this manner, all user inputs at the smartphone 210 are conveyed to the instance $275_{1}$ for that smartphone $210_{1}$.

Similarly, if a device or module in the smartphone 210 detects an event such as a screen being displayed or a time out occurring or the like, that device or module then conveys that event to the thin client $265_{1}$. Again, the thin client $265_{1}$ forwards this to the server 120 together with the port number information for that device. The server 120 relays this information to the instance $275_{1}$ for that smartphone $210_{1}$ which can interpret the meaning of this event.

The instance $275_{1}$ for that smartphone $210_{1}$ sends display information and device-specific data in response to these user inputs and/or events. The thin client $265_{1}$ for that smartphone $210_{1}$ routes this received information based on the port number information provided therewith. For example, the display information is routed to the customer display. The thin client $265_{1}$ is not (and does not need to be) aware of the type of device associated with each port number because the thin client $265_{1}$ is merely routing the information according to the port number provided with that information.

It should now be appreciated that display data, device-specific data, and routing information for the device-specific data at the smartphone 210 is received at the smartphone 210 from the remote server 120 (specifically from the instance $275_{1}$ for that smartphone $210_{1}$) responsive to the inputs and events at the smartphone $210_{1}$. Display data can be presented to a customer via a user display of a user interface at the smartphone 210 and device-specific data can be conveyed to a respective device at the smartphone 210 (such as a speaker or the like) based upon routing information that is common to both the smartphone 210 and the instance 275 for that smartphone 210. Thereafter, one or more functions are implemented by the various devices at the smartphone 210 in response to the device-specific data received from the instance $275_{1}$ for the smartphone $210_{1}$.

Certain embodiments of the present invention enable a customer transaction to be initiated at a smartphone or other such hand held device via a number of optional techniques. For example, by touching an appropriate location on a touchscreen of a smartphone or by selecting a card stored in an electronic mobile phone "electronic wallet". Alternatively, a different type of PIN may be entered via a user interface whereby rather than a four digit code being entered, a sequence of pictures displayed on a user display may be selected in a pre-determined order, or a one-time PIN may be entered.

Certain embodiments of the present invention enable a "withdrawal" of funds from a customer's bank account to be performed. This is an example of a customer transaction which may be performed according to certain embodiments of the present invention. The funds may be transferred from a bank account into an "electronic wallet" on a smartphone or to a "PayPal™" account associated with a user of the smartphone or other designated recipient. Funds may also optionally be transferred into "PingIt™" account or any other account available via the smartphone.

Certain embodiments of the present invention enable statements to be downloaded onto a mobile phone or optionally to a selected e-mail address and other transactions such as balance enquiries, money transfers, bill payments, to be performed.

While certain of the present invention have been described with respect to a system which includes providing ATMs with access to a virtualized operating system and virtualized ATM application, it will be appreciated that certain embodiments of the present invention can use conventional ATMs in hand with hand held devices and a server that provides those hand held devices with access to a virtualized operating system and ATM application.

Various modifications may be made to the above described embodiments within the scope of the present invention. For example, in other embodiments, the network 130 may be a Local Area Network (LAN), a public Wide Area Network (WAN), or any other convenient network.

In other variations, other remote display protocols, such as the Remote Desktop Protocol (RDP) or the like, can be utilized.

In certain other embodiments, Citrix HDX (trade mark) or the like may be used instead of VMWare Horizon View. Citrix HDX is available from Citrix Systems Inc., 4988 Great America Parkway, Santa Clara, Calif. 95054, U.S.A.

The particular locations in which files, or portions thereof, are shown to reside and/or execute are given by way of example to illustrate the embodiments more clearly, and are not restrictive.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What we claim is:

1. A method of performing a transaction at a hand held device,
   comprising the steps of:
   launching a hand held application on the hand held device;
   creating and initiating, by a remote server, an instance of an Automated Teller Machine (ATM) application that executes on the server when the hand held application makes a connection to the remote server on the launching;
   accessing a virtualized operating system and the instance of the ATM application at a hand held device;
   accessing the virtual operating system and the instance of the ATM application at an ATM through network connections to the remote server;
   remotely executing the virtualized operating system and the ATM application on the remote server;
   accessing by both the ATM and the hand held device the instance of the ATM application executing on the remote server for processing transactions initiated on the ATM and the hand held device through the hand held application; and
   performing a customer transaction at the hand held device using the virtualized operating system by forwarding user generated events produced from the user operating the hand held device and the instance of the ATM application from the remote server to the ATM acting as a thin client to a backend server that processes the customer transaction and routing information between the hand held device, the ATM, and the remote server based on device port assignments during the customer transaction, wherein performing further includes receiving, at the ATM during the customer transaction, at least some routing information provided from the instance of the ATM application executing on the remote server that provides a particular port assignment that the ATM processes for accessing a card reader and a cash dispenser during the customer transaction, and wherein the at least some routing information includes commands that only firmware of the card reader and cash dispenser understands how to process, wherein the thin client is unaware of a type of device that is attached to the particular port, and wherein the ATM processes a recovery program that causes the card reader to return a customer card inserted into the card reader of the ATM during the customer transaction when a communication failure is detected between the ATM and remote server.

2. The method as claimed in claim 1, further comprising:
   receiving user inputs from the customer at a User Interface (UI) of the hand held device;
   via a wireless communication link, providing at least one of received user inputs or events from the hand held device to the remote server performing the operating system and instance of the ATM application; and receiving at least display data at the hand held device from the remote server responsive to said inputs and events.

3. The method as claimed in claim 2, further comprising: receiving the display data and command data at the hand held device via a communication link display protocol.

4. The method as claimed in claim 1, further comprising: initiating a transaction at the hand held device by touching a touchscreen display of the User Interface (UI) of the hand held device.

5. The method as claimed in claim 1, further comprising: initiating a transaction at the hand held device by inputting a customer authentication input at a User Interface (UI) of the hand held device.

6. The method as claimed in claim 5 wherein inputting a customer authentication comprises entering a one-time PIN.

7. The method as claimed in claim 5 wherein the step of inputting a customer authentication comprises selecting a correct picture sequence.

8. The method as claimed in claim 1 whereby the step of performing a customer transaction comprises:
withdrawing funds from a bank account associated with a user of the hand held device; and
crediting corresponding funds into an electronic wallet on the hand held device.

9. The method as claimed in claim 1 whereby the step of performing a customer transaction comprises:
withdrawing funds from a bank account associated with a user of the hand held device; and
crediting corresponding funds into a social media account associated with a user of the hand held device.

10. The method as claimed in claim 1 wherein said step of performing a customer transaction comprises downloading a bank statement to the hand held device.

11. The method as claimed in claim 1 wherein the step of performing a customer transaction comprises making a balance inquiry or money transfer request or bill payment.

12. A server that provides a hand held device and an Automated Teller Machine (ATM) with access to a virtualized operating system and an instance of an ATM application processing within the virtualized operating system through the ATM acting as a thin client to the server, wherein the instance of the ATM is created and initiated on the server when a hand held application is initiated on the hand held device and the hand held device connects to the server, and the ATM includes a separate connection to the server, wherein the server includes the virtualized operating system remotely accessed by the hand held device through the hand held application, and wherein events generated by a user operating the hand held device are forwarded to the instance of the ATM application and on to the ATM for processing a transaction of the user at the ATM through the server by the virtualized operating system and the instance of the ATM application executes on the server and routes information between the hand held device, the ATM, and the server based on device port assignments during the transaction, and wherein at least some routing information provided from the instance of the ATM application on the remote server includes a particular port assignment that instructs the ATM to access a card reader and a cash dispenser during interaction with the hand held device and wherein the at least some routing information includes commands that only firmware of the card reader and cash dispenser understands how to process, and wherein the thin client is unaware of a type of device that is attached to the particular port, and a recovery program is provided to the ATM that activates during a communication failure between the ATM and the server and that causes the card reader to return a customer card that was inserted into the card reader of the ATM during the transaction.

13. The server as claimed in claim 12, further comprising at least one software image of an operating system and the instance of the ATM application.

14. The server as claimed in claim 12, further comprising:
a Server Hardware Platform (SHP);
a hypervisor running on the SHP; and
at least one ATM desktop operating system instance on the SHP.

15. A method of operating a hand held device to execute a transaction for a user of the hand held device, the method comprising the steps of:
launching a hand held application on the hand held device;
creating a connection by the hand held application to a remote server and causing by the connection the remote server to create an instance of an Automated Teller Machine (ATM) application and initiating the ATM application on the remote server for processing;
during a communication session associated with the connection to the remote server processing a virtualized operating system and the instance of the ATM application from the hand held application;
interacting by the to a hand held device with an ATM acting as a thin client, wherein the ATM also processes the virtualized operating system and the instance of the ATM application from the remote server;
receiving a transaction request from the hand held application;
providing the transaction request to the virtualized operating system and instance of the ATM application via the communication session as events produced by a user operating the hand held device and routing information between the hand held device, the ATM, and the remote server based on device port assignments during the transaction; and
receiving a response from the virtualized operating system and instance of the ATM application, said response including information to be presented by the hand held device to a user that the transaction has been performed at the ATM through a backend server in response to the events being supplied from the remote server to the ATM and from the ATM to the backend server, and wherein receiving further includes providing at least some events from the instance of the ATM application to the ATM instructing the ATM to access a card reader and a cash dispenser during the customer transaction and wherein the at least some events include commands that only firmware of the card reader and cash dispenser understands how to process, and wherein the thin client is unaware of a type of device that is attached to the particular port, wherein the ATM processes a recovery program when a communication failure occurs between the ATM and the remote server that causes the card reader to return a customer card inserted into the card reader during the transaction back to the user.

* * * * *